(No Model.)
J. M. J. BARTON.
VENTILATING MARINE VESSELS.
No. 306,209. Patented Oct. 7, 1884.
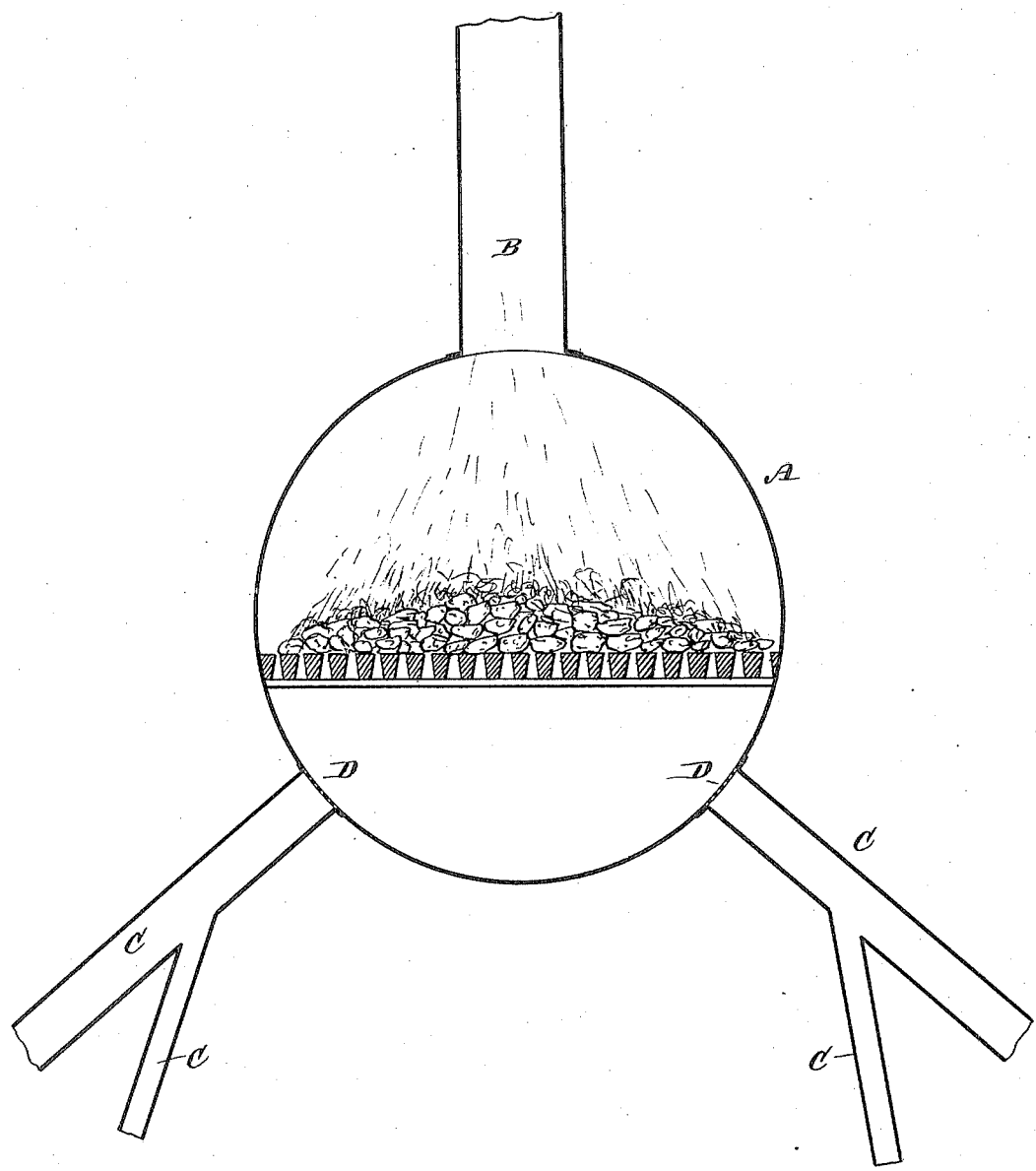

United States Patent Office.

JULIUS MILTON JAQUES BARTON, OF SYDNEY, AUSTRALIA.

VENTILATING MARINE VESSELS.

SPECIFICATION forming part of Letters Patent No. 306,209, dated October 7, 1884.

Application filed May 1, 1884. (No model.)

*To all whom it may concern:*

Be it known that I, JULIUS M. J. BARTON, of Sydney, Australia, have invented a new and useful Improvement in Ventilating Marine Vessels, of which the following is a full, clear, and exact description.

The object of my invention is to provide a new and improved system of ventilation for marine vessels, whereby the said vessels can be ventilated very thoroughly at a comparatively small cost.

The invention consists in the combination, with a furnace in a marine vessel, of a series of pipes extending from the several compartments in the vessel to the furnace, for the purpose of conducting all the foul and impure air in the several compartments into the furnace.

Reference is to be had to the accompanying drawing, forming part of this specification, in which my system of ventilation is shown.

A furnace, A, is provided with a smoke-stack, B, of some suitable construction, which, if desired, can be connected with a suction-blower or long funnel to increase the draft. The furnace is closed perfectly at the bottom, and the coal-doors, &c., made to fit very closely, so that no air can pass into the furnace except through the pipes C provided for this purpose. The pipes C extend to the different rooms, cabins, holds, and compartments of the vessel. The fire in the furnace causes a draft, and as no air can enter the furnace except through the pipes C great suction will be produced in these pipes, and all the foul and impure air in the several parts of the ship will be drawn into the furnace, and fresh air will naturally pass into the several compartments through means provided for this purpose, and thus occupy the place of the exhausted foul air. The vessel will thus be ventilated thoroughly. The ends of the pipes C must be closed by gratings or screens D, to prevent live hot coals, &c., from dropping into the pipes.

This device can be applied in all marine vessels, but is especially adapted for steamers, as the furnace of the boiler can then be used for the ventilating purposes. In sailing-vessels a special boiler would have to be provided.

Having thus described my invention, I claim as new and desire to secure by Letters Patent—

1. The furnace with its fire-chamber wholly cut off from the immediate surrounding atmosphere, and having a central upper draft and smoke flue, in combination with the pipes leading from compartments of the vessel, connecting with said furnace below its fire-grate, substantially as and for the purpose set forth.

2. The furnace with its fire-chamber wholly cut off from the immediate surrounding atmosphere, and having a central upper draft and smoke flue, in combination with the pipes leading from compartments of the vessel and connecting with the furnace below the fire-grate, said pipes being provided with screens at their points of connection with the furnace, substantially as and for the purpose set forth.

JULIUS MILTON JAQUES BARTON.

Witnesses:
WILLIAM HENRY BARTON,
CHARLES KAHLO,
*United States Consul.*